UNITED STATES PATENT OFFICE.

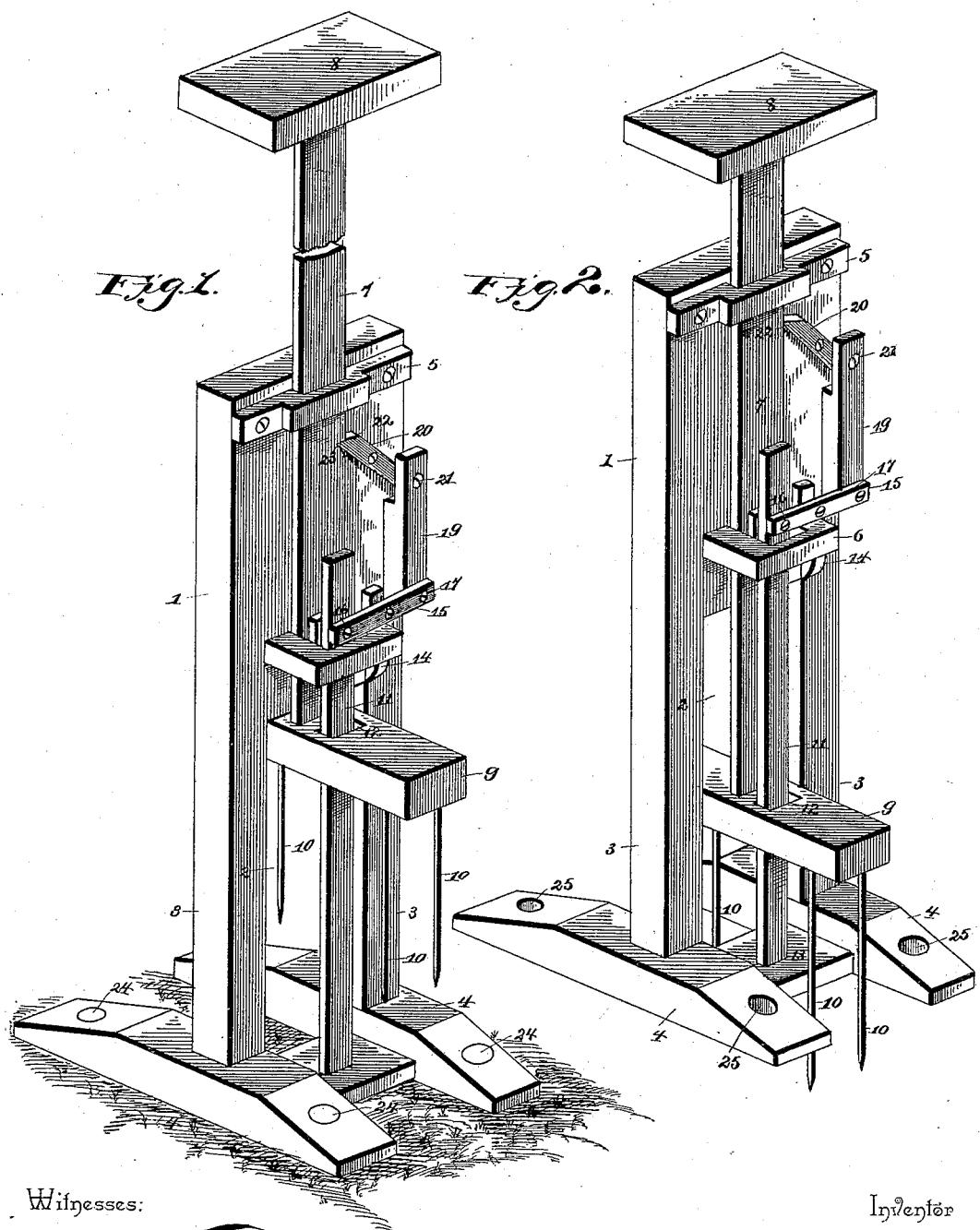

WILLIAM B. MILLS, OF MILLS' SPRING, NORTH CAROLINA.

MOLE-TRAP.

SPECIFICATION forming part of Letters Patent No. 415,728, dated November 26, 1889.

Application filed August 28, 1889. Serial No. 322,231. (No model.)

*To all whom it may concern:*

Be it known that I, WILLIAM B. MILLS, a citizen of the United States, residing at Mills' Spring, in the county of Polk and State of North Carolina, have invented a new and useful Mole-Trap, of which the following is a specification.

This invention has relation to traps for the capture of moles; and among the objects in view are to provide a trap adapted to be easily and conveniently set and mounted over the burrow of a mole, and operated or sprung by the mole in passing therethrough.

A further object of the invention is to simplify and cheapen the construction, reduce the number of parts, and to provide a trap the parts of which are not liable to get out of repair.

With these general objects in view the invention consists in certain features of construction, hereinafter specified, and particularly pointed out in the claims.

Referring to the drawings, Figure 1 is a perspective of a trap constructed in accordance with my invention, the same being set and ready for use. Fig. 2 is a similar view, the trap sprung.

Like numerals of reference indicate like parts in both the figures of the drawings.

1 represents the standard of the trap, the lower end of which is bifurcated or recessed, as at 2, and opposite legs 3, the latter mounted upon suitable transverse base-pieces 4. A guide 5 is located at the upper end of the standard, and a second guide 6 at about the center of the standard, and in the two guides is mounted for vertical reciprocation the plunger-rod 7, the upper end of which is provided with a weight 8, and the lower end of which terminates in a plate 9, adapted to reciprocate in the space 2, and provided at each of its ends with a series of impaling-teeth 10.

11 represents the trap-springing bar, which is mounted for vertical movement in the lower of the guides, and also passes loosely through an opening 12, formed in the plate or head 9, and carries at its lower end a trap-springing plate 13, also located between the legs 3 and in the space 2.

14 represents a bracket secured to the front face of the standard 1, and at one side of the lower guide and in the same is pivoted a rocking lever 15, the inner end of the arm being pivotally connected to the upper end of the springing bar or rod, as at 16, and the opposite or outer end likewise pivoted, as at 17, to the lower end of a connecting-arm 19.

20 represents a pivoted trigger, the outer end of which is pivotally connected, as at 21, to the connecting-arm 19, and the outer end of which is cut away or beveled, as at 22, and adapted for removable connection with a notch 23, formed in the adjacent edge of the plunger-bar.

In operation the trap is set over the burrow of a mole, and by suitable wooden pegs or other securing pins or devices 24, inserted through openings 25 in the bases and into the ground, the trap is maintained in position. The plunger-rod is now raised until its notch engages with the beveled edge of the trigger, when it will be apparent that the same is supported thereby and the trap set. A mole passing through his burrow will raise the springing plate and rod, which oscillates the rocking lever and disconnects the end of the trigger from the engaging-notch, which liberates the plunger and lets fall the impaling-teeth, which impale the mole.

Having described my invention and its operation, what I claim is—

1. In a mole-trap, the combination, with the standard and its base and guides arranged upon the standard, of a vertically-reciprocating plunger having a notch at one side, a weight mounted upon the plunger and a head carrying impaling-teeth at the lower end thereof, a vertically-reciprocating springing bar mounted in the guide of the standard and passing through an opening in the head and terminating at its lower end in a springing plate, a rocking lever pivoted at one side of the plunger and pivotally connected at one end with the springing bar, a trigger pivoted above the rocking lever and engaging the notch in the plunger, and an arm pivotally connecting the outer ends of the lever and trigger, substantially as specified.

2. In a mole-trap, the combination, with the standard having vertically-opposite guides, of a reciprocating weighted plunger having a notch, a reciprocating springing bar, a trigger pivoted at one side of the plunger and engaging the notch, a rock-arm pivoted at one side of the springing bar and having its inner end pivotally connected thereto, and a connecting-arm connecting the outer ends of the lever or arm and the trigger, substantially as specified.

3. The combination, with the standard, the lower end of which is bifurcated to form legs 3 and an intermediate space 2, each of the legs being provided with bases and the vertically-opposite guides mounted on the face of the standard above the bifurcation, of the plunger mounted in the guides, a weight secured to the upper end thereof, and a slotted head at the lower end provided with impaling-teeth and mounted in the space 2, the springing bar mounted for reciprocation in the slot in the head and the lower of the guides, and a plate secured to the lower end of the bar and within the space 2, a bracket secured to the face of the standard at one side of the bar, a rocking lever pivoted in the bracket and pivotally connected at its inner end to the upper end of the bar, a trigger pivotally connected to the face of the standard above the lever and having a beveled end adapted for engagement with a notch formed in the edge of the plunger, and an arm connecting the outer ends of the lever and trigger pivotally with each other, substantially as specified.

In testimony that I claim the foregoing as my own I have hereto affixed my signature in presence of two witnesses.

WILLIAM B. MILLS.

Witnesses:
D. I. NELSON,
M. P. WORTMAN.